UNITED STATES PATENT OFFICE.

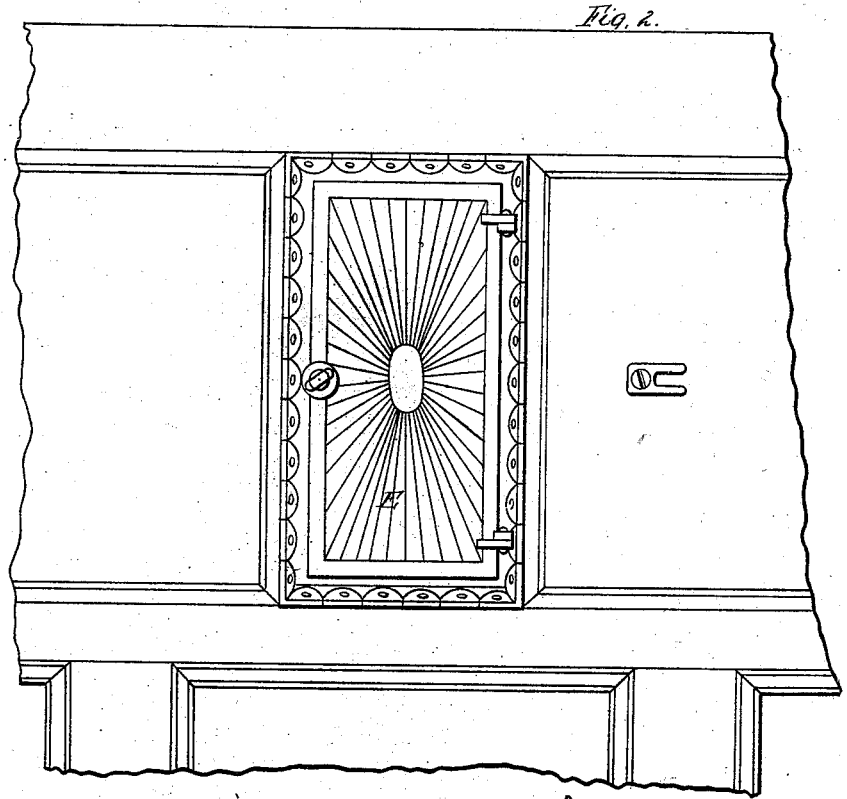
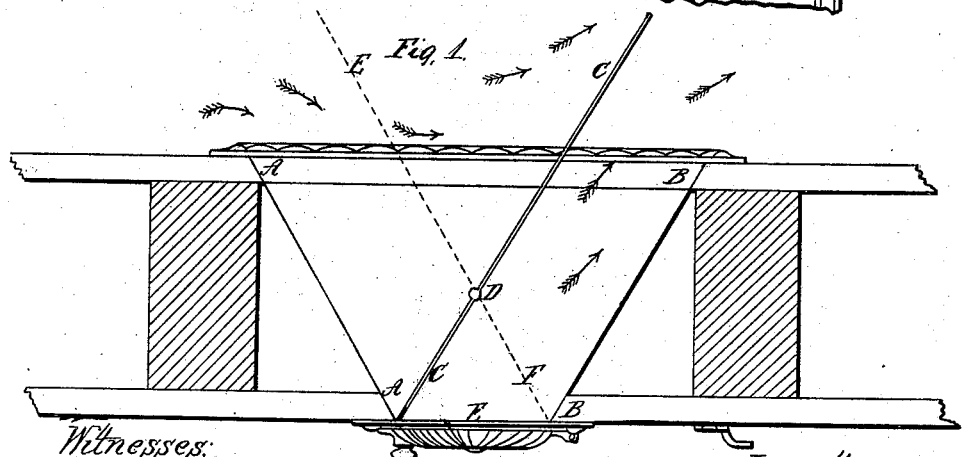

WM. G. CREAMER, OF BROOKLYN, NEW YORK.

VENTILATOR FOR RAILROAD-CARS.

Specification of Letters Patent No. 33,071, dated August 20, 1861.

*To all whom it may concern:*

Be it known that I, WILLIAM G. CREAMER, of the city of Brooklyn, county of Kings, State of New York, have invented a new and Improved Ventilator for Railroad-Cars or Steamboats; and I hereby declare that the following is a full and exact description of the same, reference being made to the accompanying drawings and the letters of reference marked thereon.

The nature of my invention consists in providing in the side of the car over the windows and near the roof (or in the roof if necessary) an opening in which is placed a self acting deflector which operates by the motion of the car to form or cause a strong outward draft from the inside of the car.

To enable others skilled in the arts to make and use my invention I will proceed to describe its construction and operation. I make an opening in the side of the car, say three inches wide inside and nine inches wide outside. As shown in Plate first by the lines A A and B B this opening is about seven inches high. In this opening I place a vertical blind or deflector C C which works backward or forward on a pivot D. On the inside of the car is a door E which closes the opening entirely when desired. Plate first is a cross section of a part of a car over the windows. Plate second is a part of the inside of the car with the ventilator door closed.

When the car is moving from right to left the current of air formed by the rapid movement of the car fixes the deflecting blind C C in the position shown by the drawing causing a strong exhausting current from the inside of the car outward (the door E being open). As the car moves in the opposite direction the blind takes the position shown by the dotted lines F F automatically without any attention whatever. The position of the blind is steady and permanent in either position until the direction of the train is reversed. If the wind is blowing in the same direction in which the train is moving and the train stops at a station the blind goes forward for the time being and prevents the wind blowing in on the passengers' heads. This invention is also applicable to steamboats and the cabins of steamships or the sides of buildings exposed to strong lateral currents of air.

What I claim as my invention and desire to secure by Letters Patent is—

The construction of a tunnel shaped opening within the walls of the car substantially as described, and the connection therewith of a self-acting blind or deflector operating substantially as described and for the purposes mentioned.

WM. G. CREAMER.

Witnesses:
JAMES B. COX,
JOHN H. MORE.